March 10, 1953  L. M. SCHMIDT  2,630,969
DECIMAL COUNTING AND INDICATING SYSTEM
Filed March 5, 1949  2 SHEETS—SHEET 1

Inventor:
Lothar M. Schmidt,
by Merton D. Moore
His Attorney.

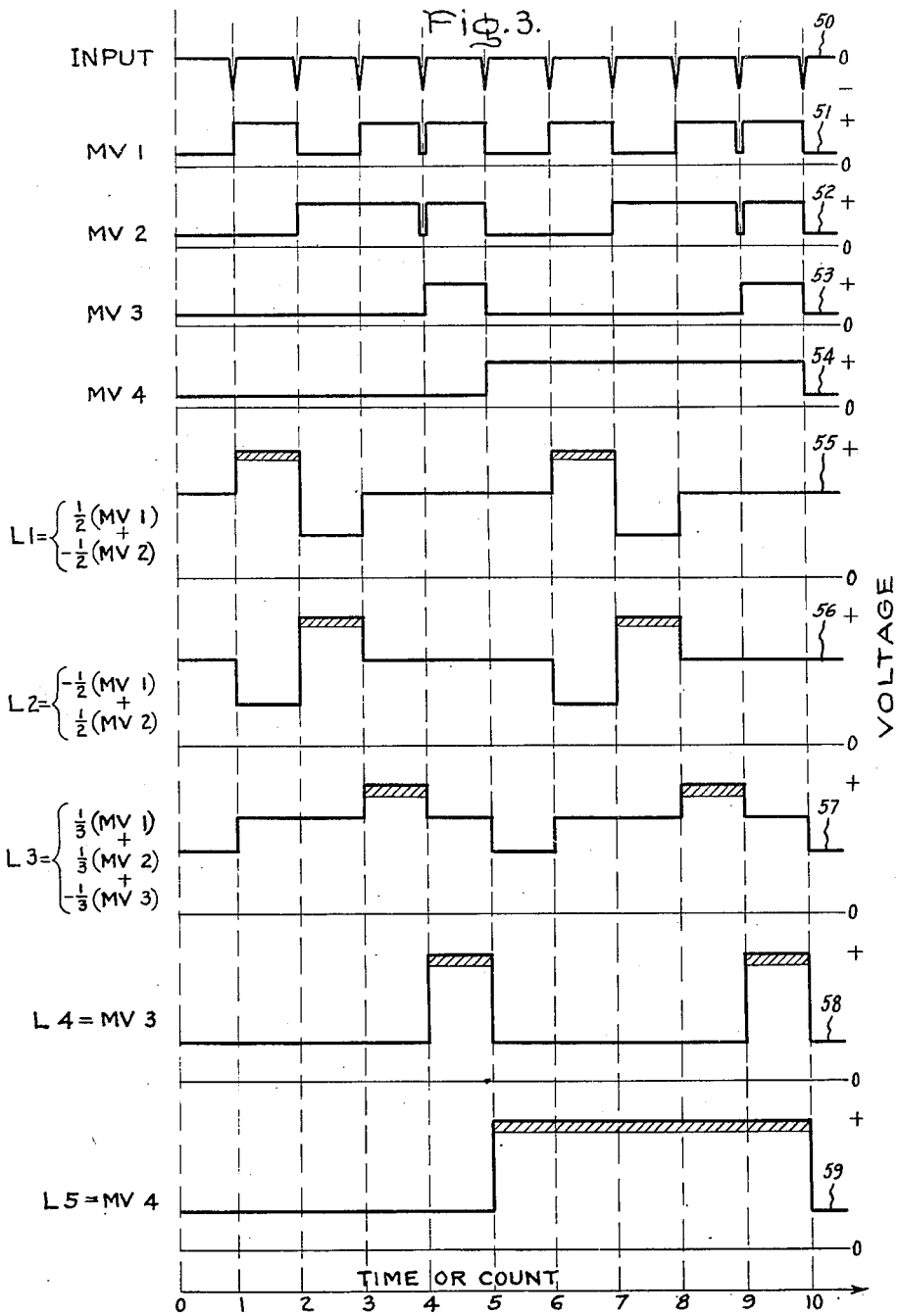

Patented Mar. 10, 1953

2,630,969

UNITED STATES PATENT OFFICE 2,630,969

DECIMAL COUNTING AND INDICATING SYSTEM

Lothar M. Schmidt, Syracuse, N. Y., assignor to General Electric Company, a corporation of New York Application March 5, 1949, Serial No. 79,776

4 Claims. (Cl. 235—92)

This invention relates generally to counting and indicating systems, and more particularly to a decimal counting system utilizing electrical multivibrators, of the type having two conditions of stability, connected in cascade.

The basic element commonly used in electronic counters is a multivibrator having two states of stability. In accordance with well known principles, such a multivibrator may be designed to change from one stable state to the other upon the application of signals of one polarity, and to be non-responsive to signals of opposite polarity. The output of the multivibrator may be a signal of one polarity, occurring at the transition from the first stable state to the second, and of the other polarity occurring at the transition from the second stable state to the first. Thus, such a multivibrator provides an output containing only one signal of one polarity when two signals of the same polarity have been supplied to its input circuit. Such a multivibrator constitutes a binary counter, or in other words, a counter to a scale of two.

Starting with a binary counter as a basic scale of two, it is apparent that a counter to any scale in powers of two may be constructed by joining binary counters in cascade. Thus four binary counters connected in cascade provide a scale of sixteen, the fourth counter in the chain providing one output pulse for every sixteen pulses supplied to the input of the first counter. It is also well known in the art that a chain of binary counters may be converted to count to a scale other than an integral power of two, by feeding back signals to preceding counters in the chain. When a signal is fed back to a preceding counter it retains its new position, and that is, in effect, equivalent to advancing the count by the natural count of the multivibrator with regards to the input to the chain. By advancing the count by a total of six counts, the natural count of a chain of sixteen is changed to ten.

Considering a counting chain consisting of four binary counters connected in cascade, the natural count of the chain is sixteen. If a signal is fed back from the third counter in the chain to the first and to the second simultaneously, due to the fact that two feed-back signals occur in a decimal sequence, the count of the first counter is advanced by two and that of the second by four, so that the result is a decimal counting chain.

Various indicating systems are known in the art for providing an immediate interpretation of the count of a decimal counting chain. Most of these systems employ neon lamps as the indicating elements and use one lamp to indicate each number from one to ten. Such a system is often quite complicated and requires an excessive quantity of components.

It is accordingly, an object of this invention to provide a new and improved indicating system to operate in conjunction with a decimal counting chain, for giving an immediate indication of the count.

Another object of this invention is to provide an indicating system, operating in conjunction with a decimal counting chain, which will reduce the number of indicating elements without presenting any difficulties of interpretation.

For further objects and advantages and for a better understanding of the invention, attention is now directed to the following description and accompanying drawings, and also to the appended claims in which the features of the invention believed to be novel are particularly pointed out.

In the drawings:

Fig. 3 shows a series of curves on a common time or count scale illustrating the operation of the various counters and indicators in the embodiment of Fig. 2.

In accordance with my invention, a decimal counter, comprising four binary counters connected in cascade, is employed. The first three counters in the series constitute a quinary counting chain or, in other words, a scale of five, and the fourth counter in the series, being a scale of two, multiplies the count of the quinary chain to provide a scale of ten. Connected to the quinary chain, four indicating lamps are provided which light separately to indicate the first four numbers in a sequence of five. In addition, a fifth indicating lamp is provided which is connected to the fourth counter and which lights for the complete duration of a sequence of five on alternate sequences.

Figure 1:
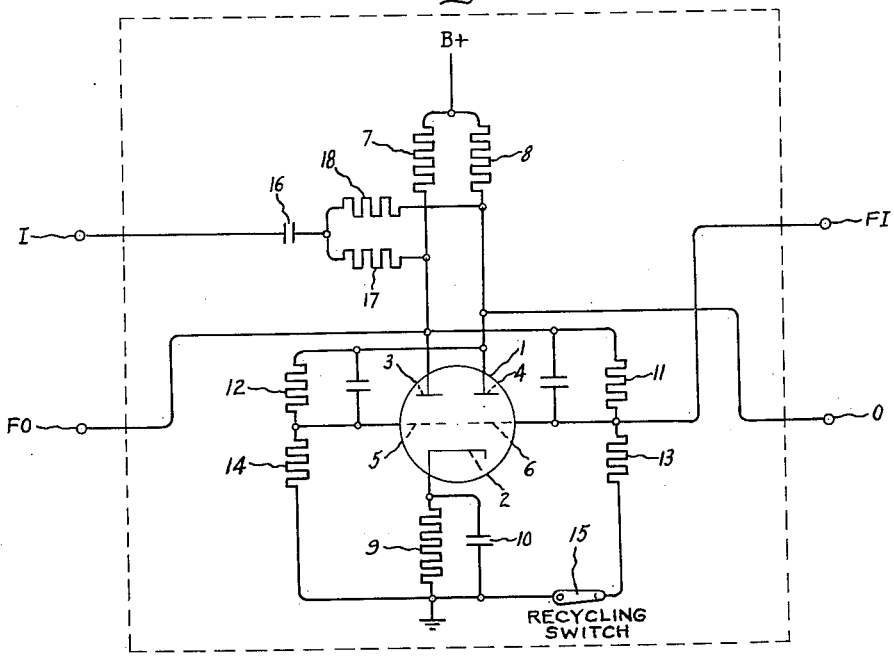
Fig. 1 is a schematic diagram of a multivibrator circuit of the type having two states of stability and suitable for use as a binary counter.

Referring now to Fig 1, the basic multivibrator circuit which is utilized as a binary counter in my invention comprises an electronic discharge device 1 of the double triode type having a common cathode 2, and a pair of anodes 3 and 4 with their associated control electrodes 5 and 6.

The anodes 3 and 4 are connected through resistors 7 and 8 to a source of operating potential indicated by B+. The cathode 2 is connected to ground through a resistor 9 in parallel with a shunt capacitor 10.

Cross-connections between anodes and control electrodes of the two halves or sections of device 1 are provided by a resistor 11 between anode 3 and control electrode 6, and by a resistor 12 between anode 4 and control electrode 5. Control electrode 6 is normally connected to ground through a resistor 13, and similarly control electrode 5 is connected to ground through a resistor 14. The circuit connecting control electrode 6 to ground comprises a switch 15 which may be opened for recycling the multivibrator, as will be more fully explained later.

A terminal I, adapted to receive input signals to the multivibrator, is connected through a capacitor 16 to the junction of a pair of resistors 17 and 18 connected respectively to the anodes 3 and 4. The output signals or pulses from the circuit are available at a terminal O which is directly connected to anode 4. The circuit comprises, in addition, a terminal FI connected to the control electrode 6 and a terminal FO connected to anode 3. Terminal FI is adapted to receive input feed-back signals from a succeeding counter in a chain, and terminal FO is adapted to provide output feed-back signal to a preceding counter.

In operation, either section of device 1 conducts at any one time but both sections cannot conduct simultaneously. In other words, current flows from cathode 2 to either anode 3 or anode 4 but does not flow to both simultaneously. For a fuller explanation of the operation of the multivibrator circuit, reference may be made to United States Patent No. 2,554,994 of Burton A. Lester entitled "Electronic Switching Circuit," and assigned to the same assignee as the present invention.

In counter chains or systems, it is desirable that the multivibrator respond to pulses of one polarity only. This particular multivibrator circuit is designed to respond to negative pulses only. Moreover, the normal or zero count state of the multivibrator is that in which anode 4 is conducting and anode 3 is non-conducting. The multivibrator may be set in its normal or zero count state at any time by momentarily opening re-cycling switch 15. When this is done, control electrode 6 is connected to anode 3 through resistor 11, and so assumes a positive potential, causing current to flow to anode 4, no matter to which anode current had previously been flowing. Current to anode 3 is then cut off through the normal operation of the multivibrator.

Whenever the circuit is in its normal state, it may be changed to its other stable state, which will henceforth be termed its non-normal state, through the application of a negative pulse to the terminal FI. This negative pulse appears at the control electrode 6, and current to anode 4 is cut off, causing a reversal of the states of the multivibrator. A negative signal may be obtained at the terminal FO for feeding back to preceding multivibrators in a chain, whenever the multivibrator passes from its normal to its non-normal state. This results from the fact that anode 3 in the normal state is non-conducting and accordingly, it provides a negative increment of voltage at terminal FO when it begins to conduct.

Figure 2:
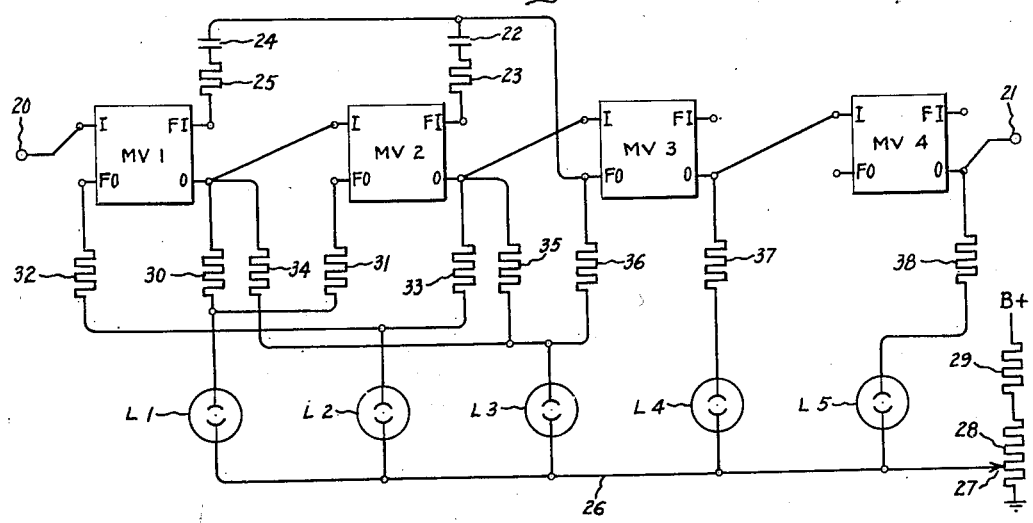
Fig. 2 is a simplified schematic diagram of a decimal counting and indicating system embodying my invention.

Referring to Fig. 2, the circuit shown therein comprises four multivibrators identical to that illustrated in Fig. 1. These multivibrators have not been drawn, but instead are indicated by the boxes numbered MV 1 through MV 4. The four terminals I, FI, O and FO have been indicated for each multivibrator and correspond to the same terminals in the circuit of Fig. 1. Input signals are provided to a terminal 20 connected to the input terminal I of multivibrator MV 1. The output terminal O of each multivibrator in the series is connected to the input terminal I of the succeeding multivibrator. The output terminal of the last multivibrator MV 4 is connected to an output terminal 21. Thus the four multivibrators together, with nothing more, constitute a counting chain to a scale of 16, which provides a single negative pulse at terminal 21 for every 16 negative pulses applied to terminal 20.

The scale of the counter is changed from 16 to 10 through the feed-back circuit from terminal FO of multivibrator MV 3, through series capacitor 22 and resistor 23 to terminal FI of multivibrator MV 2, and through series capacitor 24 and resistor 25 to terminal FI of multivibrator MV 1.

The operation of the circuit with the feed-back connections may more readily be understood with reference to curves 50 through 54 of Fig. 3. Curve 50 illustrates the negative pulses applied to input terminal 20. For purposes of simplification, these pulses have been shown as occurring at equal time intervals, although this is immaterial to the operation of the circuit. It simply insures the symmetry of the drawing to facilitate a comparison of the different curves. Curves 51, 52, 53, and 54 indicate the voltage at the output terminal O of multivibrators MV 1, MV 2, MV 3 and MV 4 respectively. The voltage of terminal O is actually the voltage at anode 4 of the multivibrator tube. Since the voltage at terminal FO is that at the anode 3, curves 51 to 54 may also represent the voltages at the terminals FO through a reversal of the polarity of the scale to which the curves are drawn. All the multivibrators operate in normal manner as binary counters up to the count of four. At the count of four, multivibrator MV 3 feeds back a negative signal to multivibrators MV 1 and MV 2. Multivibrator MV 1 is thereby advanced by a count of one and multivibrator MV 2 is advanced by a count of two. At the fifth count, all four multivibrators advance as if they were passing from the seventh to the eighth counts on the basis of a scale of sixteen. The first three multivibrators thereupon reverse to their normal states, whereas the fourth multivibrator passes from its normal to its non-normal state, remaining in its non-normal state through the count of nine. The sequence of operations starting with the sixth count is identical with the sequence starting from the first count, except that at the tenth count MV 4 reverts from its non-normal to its normal state.

The indicating system operating in conjunction with the counting chain comprises five neon lamps L1 through L5. One terminal of each of these lamps is connected through a common lead 26 to an adjustable tap 27 on a potentiometer 28. Potentiometer 28 is connected in series with a resistor 29 to a source of positive potential indicated by B+. The other terminals of the neon lamps are connected through series resistors 30 to 38, to one or more of the O and FO terminals of the multivibrators. These series resistors function as voltage dividers to insure that where a lamp has more than one connection to the multivibrator terminals, the voltage applied to the lamp is the mean of the voltages at the terminals connected thereto. Also the resistors function as current limiters after conduction through the lamps has started, and limit the current therethrough to a safe value.

An inspection of curves 51 through 54 of Fig. 3 will show that any one count in a decimal sequency may be completely identified by one distinct combination of the two possible states of all four multivibrators. Furthermore, any one count in a quinary sequence is completely identified by a distinct combination of the two possible states of the first three multivibrators. In this latter case, the fourth multivibrator distinguishes between quinary sequences, in a decimal sequence, by shifting from its normal to its non-normal state at the fifth count.

In accordance with my invention, the indicating system is predicated on the identification of counts in a quinary sequence with four separate indicators, and the identification of the two quinary sequences in a decimal sequence with a fifth indicator, the counts of zero or ten being indicated by no lamp lighting. To this end, lamp L1 is connected through a resistor 30 to terminal O of multivibrator MV 1, and through resistor 31 to terminal FO of multivibrator MV 2. The resultant voltages developed across the electrodes of the lamp are the resultants of the addition of curve 51 and the subtraction of curve 52. This results in a maximum voltage being produced across lamp L1 at the first and sixth counts, at which counts, the lamp accordingly lights. This is shown in curve 55, which is the resultant of the addition of curve 51 and of curve 52 reversed in polarity. The cross-hatched portions, in curve 55 as well as in the other curves, illustrate the regions in which the striking potentials of the lamps are exceeded and in which the lamps accordingly light.

Lamp L2 is connected through a resistor 32 to the terminal FO of the multivibrator MV 1, and through a resistor 33 to the terminal O of multivibrator MV 2. The voltage developed across lamp L2 in this case attains a maximum at the second and seventh counts, as illustrated by curve 56.

Lamp L3 is connected through a resistor 34 to terminal O of multivibrator MV 1, through resistor 35 to terminal O of multivibrator MV 2, and through resistor 36 to terminal FO of multivibrator MV 3. In this case, the voltages from all three multivibrators must combine in positive polarity for the lamp to strike. This occurs at the third and eighth counts, as illustrated by curve 57.

Lamp L4 is connected through resistor 37 to terminal O of multivibrator MV 3 and lights at the fourth and ninth counts, as illustrated by curve 58.

Lamp L5 is connected through resistor 38 to terminal O of multivibrator MV 4. This lamp accordingly lights at the fifth count and remains lit until the tenth count, which is, in effect, the zero count of a succeeding decimal sequence.

Thus lamps L1 through L4 light up individually in sequence to indicate numbers from 1 to 4. Lamp L5 lights at the count of five, and remains lit until the count of ten. The numbers from 6 to 9 are indicated by lamps L1 through L4 lighting again in sequence while lamp 5 remains lit. Thus number 1 is indicated by lamp L1 lighting singly; number 5, by lamp L5 lighting singly; number 6 is indicated by lamps L5 and L1 lighting together. Number 10 or zero is indicated through the extinguishing of all five lamps.

While a specific embodiment has been shown and described, it will, of course, be understood that various modifications may be made without departing from the invention. The appended claims, are, therefore, intended to cover any such modifications within the true spirit and scope of the invention.

What I claim as new and desire to secure by Letters Patent of the United States is:

1. A decimal counting and indicating system comprising four binary counters connected in cascade, feedback connections in the first three of said counters for constituting a quinary counting chain, four indicators connected to said chain for individually indicating the first four counts of a quinary sequence, and an indicator connected to said fourth counter for simultaneously indicating alternate quinary sequences.

2. A decimal counting and indicating system comprising four binary counters connected in cascade, feedback connections from said third counter to said first and second counters for providing one advance in the natural counts of said first and second counters whenever said third counter receives a normal count, whereby said first, second, and third counters constitute a quinary counting chain, four indicators connected to said chain for individually indicating the first four counts of a quinary sequence and an indicator connected to said fourth counter for simultaneously distinguishing between first and second quinary sequences in a decimal sequence.

3. A decimal counting and indicating system comprising four binary counters, said counters being constituted by electronic multivibrators of the type having two electron discharge devices possessing two stable states of conduction in which one or the other of said devices is conducting while the other is non-conducting, one of said states being normal and the other non-normal, said counters having an input and a feed-back input terminal, an output and a feed-back output terminal connected to the anodes of said devices, said counters having the characteristics of passing from either state to the other whenever a signal of one polarity is applied to said input terminal, of passing from said normal to said non-normal state when a signal of said one polarity is applied to said feed-back input terminal, of providing a signal of said one polarity at said output terminal during the transition from said non-normal to said normal states, and of providing a signal of said one polarity at said feedback output terminal during the transition from said normal to said non-normal state, progressive connections from the output to the input terminals of said four counters for cascading their counts to a scale of sixteen, connections from the feed-back output terminal of said third counter to the feed-back input terminal of said first and second counters for reducing their count to a scale of five, thereby providing an overall count to a scale of 10, four indicators having connections to the terminals of said first three counters for individually indicating the first four counts of a sequence of five counts, and a fifth indicator connected to said fourth counter for distinguishing between the first and second sequences of five counts in a sequence of ten.

4. A decimal counting and indicating system comprising four binary counters, said counters being constituted by electronic multivibrators of the type having two electron discharge devices possessing two stable states of conduction in which one or the other of said devices is conducting while the other is non-conducting, one of said states being normal and the other non-normal, said counters having an input and a feed-back input terminal, an output and a feed-back output terminal connected to the anodes of said devices, said counters having the characteristics of passing from either state to the other whenever a signal of one polarity is applied to said input terminal, of passing from said normal to said non-normal state when a signal of said one polarity is applied to said feed-back input terminal, of providing a signal of said one polarity at said output terminal during the transition from said non-normal to said normal states, and of providing a signal of said one polarity at said feed-back output terminal during the transition from said normal to said non-normal state, progressive connections from the output to the input terminals of said four counters for cascading their counts to a scale of sixteen, connections from the feed-back output terminal of said third counter to the feed-back input terminal of said first and second counters for reducing their count to a scale of five, thereby providing an overall count to a scale of 10, and five high impedance voltage indicators, said indicators having resistance connections as follows: the first, to the output terminal of said first counter and to the feed-back output terminal of said second counter; the second, to the feed-back output terminal of said first counter and to the output terminal of said second counter; the third to the output terminal of said first counter, to the output terminal of said second counter, and to the feed-back output terminal of said third counter; and the fourth and fifth to the output terminals of said third and fourth counters respectively.

LOTHAR M. SCHMIDT.

REFERENCES CITED

The following references are of record in the file of this patent:

UNITED STATES PATENTS

| Number | Name | Date |
|---|---|---|
| 2,381,920 | Miller | Aug. 14, 1945 |
| 2,422,698 | Miller | June 24, 1947 |
| 2,436,963 | Grosdoff | Mar. 2, 1948 |
| 2,470,716 | Overbeck | May 17, 1949 |

FOREIGN PATENTS

| Number | Country | Date |
|---|---|---|
| 572,884 | Great Britain | Oct. 29, 1945 |

OTHER REFERENCES

"New Vacuum Tube Scaling Circuits"; Lifschutz Pub. Physical Review; volume 57; 1940; pages 243, 244.

"A Four Tube Counter Decade"; Potter; Electronics; June 1944; pp. 110–113.

"Electronic Counters"; Grosdoff; RCA Review; September 1946; volume VII; No. 13; pages 438–447.